United States Patent Office 3,837,997
Patented Sept. 24, 1974

3,837,997
BORON NITRIDE PRODUCTS
James Economy, Buffalo, Ronald E. Highsmith, North Tonawanda, and John H. Mason, Clarence, N.Y., assignors to The Carborundum Company
No Drawing. Filed Mar. 16, 1971, Ser. No. 124,919
Int. Cl. B32b *5/16;* B44d *1/02;* C01b *21/06*
U.S. Cl. 161—170     17 Claims

ABSTRACT OF THE DISCLOSURE

A low-density product comprising boron nitride fibers bonded by boron nitride formed in situ is produced by heating a formed mass of boron nitride fibers that has been impregnated with boric acid solution to an elevated temperature in ammonia. The fibrous mass may be shaped before or after impregnation with the solution. Incorporation of a nitrogenous material in the solution gives improved results and the density may be increased, if desired, by the adidtion of fillers. Purity of the product is affected by the nitriding temperature employed.

BACKGROUND OF THE INVENTION

Boron nitride (BN) has been known for many years. It possesses a unique combination of properties. Among the most noteworthy of such properties are a high dielectric strength, a very high thermal stability, a resistance to oxidation at elevated temperatures unsurpassed by any ceramic materials other than oxides, exceptional resistance to corrosion, particularly by molten metals, and a high thermal conductivity. It has been available as a powder from which shaped articles have been formed by hot pressing, followed by machining in some cases, and as fibers. Since hot pressing is expensive and the resultant articles are quite dense, the cost of such articles has been high and relatively lightweight boron nitride articles have not been available.

SUMMARY OF THE INVENTION

The present invention provides procedures for forming articles of boron nitride which are light in weight, strong, and easily fabricated. These are produced by bonding boron nitride fiber with boron nitride formed in situ. It is thus possible to obtain boron nitride articles in various shapes which have a very low density while exhibiting the desirable properties of boron nitride. Such articles have hitherto not been available.

More specifically, boron nitride fiber may be formed into a desired shape or configuration as, for example, by loosely winding or weaving, and then impregnated with a solution containing boric acid or a material forming boric oxide upon heating and, preferably, a nitrogenous material that liberates ammonia when heated. After drying, the mass is heated to an elevated temperature in a current of ammonia for conversion to a porous solid body in which the boron nitride fibers are bonded with boron nitride formed in situ. Alternatively, a mass of boron nitride fibers is mixed with a boric acid-nitrogenous material solution of the type described above and formed into an article that is then heated in ammonia to form a solid but porous body in which boron nitride fibers are bonded with boron nitride formed in situ. In both of the procedures described above additional boron nitride and/or other fillers in finely divided form may be incorporated in the bodies to increase the density and modify the porosity thereof, if desired.

EMBODIMENTS OF THE INVENTION

It will be understood that the procedure described in the following example is only illustrative of the present invention and that many variations and modifications may be made therein. It will also be understood that the particular product to be made, the available materials and apparatus, and the time required will influence or determine which of the illustrated procedures is preferred in a specific instance.

EXAMPLE 1

A mass of boron nitride fiber cut to about 2.5 cm. length was blended into an aqueous solution saturated with boric acid ($H_3BO_3$) and containing also urea ($CO(NH_2)_2$) in a 1:1 mol ratio with the boric acid while the solution was maintained at the boiling point to increase the solubility of the boric acid. The slurry was filtered on a fine screen to give a thick, saturated web which was dried in an oven at about 250° C. while under pressure of about 1 kg./cm.$^2$ from a platen. The dried, board-like web contained 23% fiber and had a density of 0.587 g./cc.

The dried board was placed in a tube furnace which comprised a sintered alumina tube adapted to be heated exteriorly by resistance heating rods. Then, while air was excluded and dry $NH_3$ was allowed to flow over the board at a flow rate of approximately 200 cc./min., the tube was heated. The temperature was raised rapidly to 150° C., raised from 150° C. to 800° C. at 25° C./hr., raised from 800° C. to 1400° C. at 50° C./hr., raised from 1400° C. to 1500° C. at 25° C./hr., and held at 1500° C. for 2 hours. The tube was allowed to cool to room temperature while maintaining the flow of $NH_3$. The nitrided board had an average density of 0.354 g./cc. and, when analyzed, was found to comprise 42.52% B and 54.68% N. It was suitable for lining a container for molten metal.

EXAMPLE 2

A mass of boron nitride fiber chopped into lengths of about 5–6 mm. was blended into a saturated aqueous boric acid solution held at 60° C. and containing an equi-molar amount of urea. The slurry was filtered on a fine screen to give a thin, saturated web which was dried in air at about 150° C. The dried, paper-like web by analysis contained 27.64% B, 33.86% N and 4.53% C. It was calculated from the analysis that the web contained 43% fiber.

The dried web was nitrided and cooled in a tube furnace in the same way as the board in Example 1. The product was flexible, 0.5 mm. thick, and had a density of 0.18 g./cc. When analyzed the paper-like product comprised 43.46% B and 53.13% N. It could be used as a heat-resistant tube lining.

In the following example a variation in the process is illustrated.

EXAMPLE 3

A mass of boron nitride fiber chopped into 3–6 mm. lengths was blended into a boiling, saturated aqueous solution of boric acid containing an equi-molar amount of urea. The slurry was filtered on a screen to yield a thick, board-like, impregnated web which was dried at 150° C. for 18 hours under a pressure of about 1 kg./cm.$^2$ from a platen. The web after drying had a density of 0.68 g./cc. By analysis the web contained 33.33% B and 33.33% N.

The dried web was placed in a tube furnace employing a metal tube heated with resistance wire and nitrided by heating it to approximately 1000° C., using a rate of heating similar to that employed in Example 1, in a current of $NH_3$. The nitrided product after cooling in $NH_3$ was found to have a density of 0.468 g./cc. and an analysis which showed 41.58% B and 56.75% N, corresponding to a product containing over 85% BN. Moreover, it also contained a small amount of water-soluble impurities, thought to be boron-nitrogen-oxygen compounds, of indefinite and variable composition. Despite the impurities, the product was quite suitable for thermal insulation purposes.

The purity of the product of Example 3 and its chemical inertness may be improved by the procedures described in the following examples.

EXAMPLE 4

A piece of the nitrided product of Example 3 was thoroughly washed twice in boiling water and dried in air at 150° C. for 18 hours. This resulted in a loss in weight of 19%, a change in analysis to 40.43% B and 51.33% N and a reduction in density of 0.4 g./cc. The washed and dried material was placed in the carbon tube of a tube resistance furnace, heated rapidly to 2000° C. and held at that temperature for 15 min. The heating was conducted in a nitrogen atmosphere. The resultant product had a density of 0.369 g./cc. and when analyzed showed 43.94% B and 55.56% N, a total of 99.5%. Not only was the chemical inertness improved but also its thermal stability.

EXAMPLE 5

Another piece of the nitrided product of Example 3 was washed and dried in the same way as the product in Example 4. It was then renitrided by heating in ammonia as in Example 3. The renitrided product showed 41.46% B and 54.18% N when analyzed and had a density of 0.422 g./cc.

When the renitrided product was placed in a carbon tube in an inert atmosphere and heated rapidly to 2000° C. with a 15 min. hold at that temperature before cooling in the inert atmosphere, the density decreased to 0.394 g./cc. and the analysis showed 43.01% B and 56.13% N, a total of 99.14%.

To protect the boron nitride from oxidation during the high temperature reheating illustrated in Examples 4 and 5 an inert gas is employed. This may be nitrogen, argon or helium.

As previously mentioned, boron nitride fibers can be formed into shapes before impregnation and re-nitriding of the impregnated product. This is shown in the following example.

EXAMPLE 6

A length of roving formed from staple boron nitride fiber was closely wound on a cylindrical metal drum having a diameter of 16.5 cm. to form a cylindrical body of fiber about 7.6 cm. wide and 4.7 mm. thick. The drum and cylindrical body were then immersed in a boric acid-urea solution such as used in Example 1 and thoroughly saturated. The assembly was then allowed to cool and was air-dried for an hour. The cylindrical body was then cut into 4 pieces of equal length, stacked uniaxially and dried at 150° C. under a pressure of about 1 kg./cm.$^2$ applied by a platen. The resulting plate-like body had a density of 0.85 g./cc.

The plate was placed in a heat-resistant glass tube through which ammonia was passed at a rate of about 200 cc./min. and heated by a surrounding coil of resistance wire from 25° C. to 400° C. in 1 hour and from 400° C. to 800° C. in 16 hours. The plate was cooled, while continuing the flow of ammonia, to about 150° C. and then further cooled to room temperature in a desiccator. It has a density of 0.653 g./cc. and analysis showed 38.13% B, 45.52% N, and 0.70% C. This indicated that, as in Example 3, one or more boron-nitrogen-oxygen compounds were present as impurities. Nevertheless the nitrided plate was satisfactory for heat insulation.

In the following example the formation of an article from a BN fiber roving after saturation thereof with a urea-boric acid solution is described. The example also illustrates the use of a filler to increase the density of the product.

EXAMPLE 7

A length of roving formed of BN fibers was drawn through a bath containing a boiling solution of urea and boric acid like the solution disclosed in Example 1. About workable concentration when using BN powder as a filter in the solution, the powder being under 5 μm. in particle size. The roving impregnated with the solution and containing BN powder picked up therewith was wound on a drum to form a tape about 7.6 cm. wide. The tape, after drying in air for 3 hours at ambient temperature, was cut into 12.7 cm. lengths and these were stacked uniaxially and dried under a platen with a pressure of about 1 kg./cm.$^2$ at 150° C. The density of the dried plate obtained was 1.16 g./cc.

The plate was then nitrided, following the procedure of Example 1, to yield a product having a density of 0.908 g./cc. with an analysis of 41.86% B and 53.92% N.

The following examples further illustrate the use of fillers in nitrided products according to the present invention.

EXAMPLE 8

2 parts of BN fiber chopped to a length of about 6 mm. was blended with 1.5 parts of boron powder having a particle size less than 5 μm. in a boiling solution of boric acid and urea such as was used in Example 1. The slurry was filtered and dried at a platen pressure of 1 kg./cm.$^2$ at 150° C. The dried product which contained about 10% fiber and by analysis had 25.49% B and 13.46% N was then nitrided by heating in ammonia to 1500° C. in the manner described in Example 1. The nitrided product had a controlled porous structure and an analysis of 41.69% B and 53.54% N. Upon examination by X-ray, it exhibited only lines characteristic of boron nitride.

EXAMPLE 9

Chopped boron nitride fibers with lengths from about 3 mm. to about 6 mm. were blended in a solution of boric acid and urea like that described in Example 1 with about twice their weight of powdered alumina ($Al_2O_3$) having a particle size of about 5 μm. The resulting slurry was filtered to yield a wet mass that was dried, as described in Example 1, at 150° C. The dried, board-like product contained about 16% fiber and had a density of 0.645 g./cc.

The dried product was nitrided in the manner described in Example 1. The nitrided product recovered had a density of 0.46 g./cc. and showed by analysis 33.35% B, 36.84% N, and 13.61% Al. Calculation based on the analysis indicates that the product contained 25% $Al_2O_3$.

An illustration of the process of the present invention when using a nitrogenous material other than urea is found in the following example.

EXAMPLE 10

Boron nitride fiber chopped to a length of about 6 mm. was blended with a hot, saturated, aqueous solution of boric acid containing approximately an equi-molar amount of ammonium chloride dissolved therein. The slurry was filtered, without suction, in a Buchner funnel and the wet mass was dried at 150° under a platen load of 1 kg./cm.$^2$. The density of the dried, board-like product was 0.912 g./cc. After nitriding and cooling in $NH_3$ as described in Example 1, the board had a density of 0.434 g./cc. and, by analysis contained 42.45% B, 53.84% N, and only a trace, 0.04% Cl.

Although in the foregoing examples a concentrated solution of boric acid and either urea or ammonium chloride was used for impregnation in forming boron nitride bonded boron nitride fiber products, it will be understood that the composition of the impregnating solution may be varied. Since the boric acid is used as a source of boron for conversion to boron nitride, the amount used in the impregnating solution will influence the extent to which the boron nitride fibers are bonded in the final product. The concentration used may be as small as 0.5%, but in many cases the maximum possible amount is desired and the solution is therefore heated to increase the solubility of the boric acid and permit more to be used. Not only can orthoboric acid ($H_3BO_3$) be employed, but also dehydrated boric acids such as metaboric acid ($HBO_2$) and pyroboric acid ($H_2B_4O_7$) as well as boric anhydride ($B_2O_3$) which is formed by dehydration of the several boric acids. Instead of a boric acid, other soluble boron-containing compounds which will decompose under the conditions employed to form boric anhydride, for example alkyl and aryl substituted boric acids such as amyl boric acid and diphenyl boric acid, may be used in some cases.

As mentioned above, the impregnating solution preferably also contains a nitrogenous material which breaks down or decomposes, when heated, to yield ammonia. The liberation or formation of ammonia in the interior of the dried mass of impregnated BN fiber which thus occurs during heating thereof facilitates the nitriding reaction. Thus, in addition to urea and ammonium chloride, disclosed in the foregoing examples, biuret, cyanuric acid, cyanamide, thiourea, dialkyl-ureas, and ammonium thiocyanate, for example, can also be used either alone or in various combinations with each other and/or with urea, in impregnating masses of fibers. All of these decompose at elevated temperatures with the evolution of ammonia. As above indicated, the use of nitrogenous materials is desirable but not essential. When used, therefore, in the impregnating solution, the amount employed can range from a trace to the limit of solubility. However, in many cases an amount in excess of that from which $NH_3$ is evolved in more than a 2:1 ratio with respect to the boron present in the solution is economically unfeasible.

Another function of certain suitable nitrogenous materials which may tend toward their use in impregnating masses of BN fiber prior to nitriding is that of increasing the solubility of boric acid. This characteristic has been noted with respect to urea and ammonia and may be a characteristic of other suitable nitrogenous materials. The effect may be important when the formation in situ of relatively large amounts of BN is desired.

The bonded boron nitride fiber products resulting from carrying out the process of the present invention as, for example, in Example 1, are foraminous. In many cases it is desirable to modify the porosity beyond the level possible with mere impregnation. In such cases, as illustrated in certain of the foregoing examples, finely divided fillers may be employed to increase the density of the products and modify the porosity. In general, as shown above, the most satisfactory way to deposit a filler throughout the bonded product is to suspend fine particles of filler in the impregnating solution. However, if desired, the filler may be blown or sifted into the fibrous mass before impregnation with the solution. Although the filler should be finely divided since the particles must penetrate into the mass of BN fibers through the interstices thereof, there is, in generaal, nothing critical about the size of the particles. In substantially all cases fillers with an average particle size of about 40 $\mu$m. or smaller are satisfactory.

The chemical composition of the filler is also subject to considerable variation. In cases where one or more of the desirable properties of boron nitride are important in the bonded product, powdered boron or boric anhydride (which are converted to boron nitride during the heating in ammonia) or boron nitride powder can be used. Other materials suitable as fillers for some purposes include powdered silica, alumina, beryllia, magnesia, and metal powders.

The amount of filler used in a particular process will be determined in general by the density and other characteristics of the finished product desired. In many cases no filler is necessary or wanted. Consequently the range of useful filler content is from 0% to the maximum that can be incorporated. Obviously, if the filler is suspended in the impregnating solution the practical upper limit is below that concentration at which the solution becomes too thick to wet and impregnate the mass of fibrous BN. A workable concentration when using BN powder as a filter is about 23 g. per 100 cc. of impregnating solution.

In drying a formed mass of BN fiber after impregnation in accordance with the invention it is in many cases desirable to employ confining and/or compressing means such as a metal or plastic platen to minimize the influence on the density of the formed mass of any foaming or bubbling resulting from the water and other substances that are evolved during heating. The pressure exerted by the platen or other confining means may be very low, e.g. 7 g./cm.$^2$ and pressures up to about 1 kg./cm.$^2$ produce little increase in density of the product from compression. However, if it is desired to increase the product density, higher pressures can be used. When no confining means is desired, a drying schedule may be employed in which substantial drying is accomplished below the temperature where troublesome amounts of substances other than water vapor are evolved and the drying temperature is thereafter raised, preferably in two or more steps, to the desired temperature. Foaming or bubbling are thus minimized. In general, a final drying temperature, with or without a platen, of from about 150° C. to 250° C. is employed. The time required for drying will, of course, vary with the thickness of the product and the temperature used, although drying periods of 18 to 24 hours are suitable for most products.

As will be seen from the foregoing, the density of bonded products according to the present invention may vary considerably. The density is quite dependent on (a) the amount of the boron source introduced into the fiber mass by impregnation; (b) the type and amount of powdered filler employed; and (c) the pressure used in drying the mass of impregnated fibers. The range of densities is from about 0.1 g./cc. where a dilute impregnating solution is used, no filler is employed, and no pressure is used in drying, to about 1.0 g./cc. when a saturated impregnating solution and a drying pressure of about 1 kg./cm.$^2$ are employed but no filler is used. Incorporation of fillers will obviously increase the density, the extent of the increase being dependent on the specific gravity of the filler and the amount added. The density may also be increased by repeated impregnation and nitriding.

It will also be apparent from the examples set out above that products according to the invention can be produced by a number of variant nitriding and heating procedures and with a variety of apparatus. In general, nitriding of the boron compound present in an impregnated mass of boron nitride fiber can be accomplished to give useful products at temperatures as low as about 800° C., although higher temperatures, up to about 1500° C., may be employed. However, low temperature nitriding, e.g. below about 1500° C., generally gives somewhat impure products. As shown above, the purity of such products can be improved by further heating in an inert atmosphere to a higher temperature, e.g. 1800° C. to 2100° C., if desired, after washing out at least some of the soluble impurities present. The heating apparatus employed is not critical, the most convenient and economical means available being suitable.

As pointed out above, the present invention makes possible the employment of boron nitride products for many uses in which the unique properties thereof are desirable and which were not previously feasible. The relatively low density of products according to the invention and the control of the density and porosity possible by adjustment of the process open up a wide field of usefulness for boron nitride products.

Parts and percentages given herein are by weight unless otherwise indicated.

We claim:

1. A process for producing porous shaped fibrous products consisting essentially of boron nitride fibers in a matrix consisting essentially of boron nitride, said process comprising: forming a porous fibrous mass comprising boron nitride fibers impregnated with a solution containing boric acid and a nitrogenous material which liberates ammonia when heated; drying said impregnated fibrous mass; heating said dried mass in an atmosphere of ammonia to convert said boric acid in-situ to boric nitride; and further heating said porous product to at least 1500° C.

2. A process as set forth in claim 1 in which said impregnated mass is shaped before drying.

3. A process as set forth in claim 1 in which a shaped mass of fibers is formed prior to impregnation.

4. A process as set forth in claim 1 in which a filler is incorporated into said mass prior to impregnation.

5. A process as set forth in claim 1 in which a filler is incorporated into said mass during impregnation.

6. A process as set forth in claim 1 in which a shaped mass of fibers is formed and a filler is incorporated into said mass prior to impregnation.

7. A process as set forth in claim 6 in which said filler is boron nitride.

8. A process as set forth in claim 1 in which a shaped mass of fibers is formed prior to impregnation and a filler is incorporated into said mass during impregnation.

9. A process as set forth in claim 8 in which said filler is boron nitride.

10. A process as set forth in claim 1 in which a filler is incorporated into said mass prior to impregnation and said impregnated mass is shaped before drying.

11. A process as set forth in claim 10 in which said filler is boron nitride.

12. A process as set forth in claim 1 in which a filler is incorporated into said mass during impregnation and said impregnated mass is shaped before drying.

13. A process as set forth in claim 12 in which said filler is boron nitride.

14. A porous bonded fibrous product consisting essentially of boron nitride fibers bonded with boron nitride produced in-situ by impregnating a mass of boron fibers with a solution containing boric acid and a nitrogenous material that liberates ammonia when heated and heating to a nitriding temperature in the presence of ammonia.

15. A porous bonded fibrous product as set forth in claim 14 which has a density in the range from about 0.1 g./cc. to about 1.0 g./cc.

16. A porous bonded fibrous product as set forth in claim 14 in which said product also contains a filler.

17. A porous bonded fibrous product as set forth in claim 16 in which the filler comprises boron nitride.

References Cited

UNITED STATES PATENTS

| | | | |
|---|---|---|---|
| 3,351,484 | 11/1967 | Gutzeit | 23—191 X |
| 3,429,722 | 2/1969 | Economy et al. | 23—191 X |
| 3,399,979 | 9/1968 | Hamling | 23—191 X |

FOREIGN PATENTS

| | | | |
|---|---|---|---|
| 954,285 | 4/1964 | England | 23—191 |

OTHER REFERENCES

Economy et al.: Chem. Abs., vol. 67, para. 46794y (1967).

Bates et al.: Chem. Abs., vol. 67, para. 46799d (1967).

MILTON WEISSMAN, Primary Examiner

U.S. Cl. X.R.

117—26; 423—290